United States Patent [19]

Peterpaul

[11] Patent Number: 4,636,577
[45] Date of Patent: Jan. 13, 1987

[54] SOLAR PANEL MODULE AND SUPPORT THEREFOR

[75] Inventor: Joseph Peterpaul, West Orange, N.J.

[73] Assignee: Thomas & Betts Corporation, Raritan, N.J.

[21] Appl. No.: 527,439

[22] Filed: Aug. 29, 1983

[51] Int. Cl.⁴ .............................................. H01L 35/00
[52] U.S. Cl. ..................... 136/206; 136/244
[58] Field of Search .............. 126/417, 450, 426; 52/173 R; 136/206, 244

[56] References Cited

U.S. PATENT DOCUMENTS

| | | | |
|---|---|---|---|
| Re. 25,647 | 9/1964 | Mann et al. | 136/89 |
| 3,411,952 | 11/1968 | Ross et al. | 136/89 |
| 3,565,719 | 2/1971 | Webb | 156/212 |
| 3,620,847 | 11/1971 | Wine | 136/89 |
| 4,106,952 | 8/1978 | Kravitz | 136/206 |
| 4,149,025 | 4/1970 | Niculescu | 136/206 |
| 4,204,523 | 5/1980 | Rothe | 126/450 |
| 4,233,085 | 11/1980 | Roderick et al. | 136/244 |
| 4,238,912 | 11/1980 | MacDonald | 52/173 R |
| 4,241,727 | 12/1980 | Toti | 126/446 |
| 4,246,892 | 1/1981 | Waiche | 126/443 |
| 4,327,707 | 5/1982 | Wilhelm | 126/426 |
| 4,345,587 | 8/1982 | Carvalho | 126/417 |
| 4,392,009 | 7/1983 | Napoli | 136/251 |
| 4,470,406 | 9/1984 | Rinklake et al. | 126/450 |

OTHER PUBLICATIONS

Roy Gibson and Theodore Swanson—MIT Industrial Liaison Program—1983.
E. J. Stefanides—Central States Editor—"Connectors Cut Solar Electric Wiring Costs"—Design News—2/21/83—pp. 100-101.
"A Shakedown Shapes Up in Photovoltaics"—Chemical Week—2/3/82—p. 33.

*Primary Examiner*—John F. Terapane
*Assistant Examiner*—T. J. Wallen
*Attorney, Agent, or Firm*—Robert M. Rodrick; Salvatore J. Abbruzzese

[57] ABSTRACT

A solar panel module for directly mounting to a roof surface comprises a plurality of solar panels and a low profile, elongated frame including a generally flat, rectangular base having a plurality of substantially planar surfaces for supporting the under surfaces of the solar panels. The panels are removably sealed to the frames at the under surfaces thereof, rendering the upper surfaces fully free and unencumbered for receipt of incident solar radiation. The frame includes, integrally therewith, upstanding walls adjacent opposite edges of the panel supporting surfaces, defining raceway channels for concealed passage of electrical wires connected to the solar panels. The channels and walls have provision for overlapping interlocking with similarly fabricated frames for ease of installation, weather-proofing and high-density panel mounting.

8 Claims, 6 Drawing Figures

12345671

SOLAR PANEL MODULE AND SUPPORT THEREFOR

FIELD OF THE INVENTION

This invention relates to an improved solar panel module and more particularly to a solar panel module having an economical frame for supporting solar panels in a high density array and adapted for ready attachment to a roof surface.

BACKGROUND OF THE INVENTION

Extensive research effort is presently being expended to develop mass production capabilities for photovoltaic cells generating electrical energy from incident solar radiation. As used herein, a photovoltaic or solar panel refers to an array of photovoltaic cells which may comprise silicon materials or polycrystalline thin films in a common glass substrate and connected in series or parallel configurations. The resulting solar panels are fragile and should desirably be provided with a frame or other support in an overall power producing network.

While various concepts may be envisioned for mounting solar panels to a roof surface of a building, there are currently four basic generic mounting concepts: standoff, rack, direct and integral. The standoff and rack designs utilize frames typically constructed over the roofing shingles, the rack approach being used for flat or slightly sloping roofs while the standoff approach is spaced from the shingle surface at a parallel slope. In the direct mounting design the frame is secured directly to the roof sheathing and in the integral approach the frame is mounted on the roof rafters, forming a portion of the roof.

The most common mounting concept in current commercial use is the standoff design, in part, because it causes the least disruption to the roof and building occupants. The frames in such designs are typically of the picture-frame variety by which solar panels are engaged at the peripheral edges with a portion of the frame border usually extending disadvantageously onto and over an outer surface area of the solar panel. As, with current techniques, the power conversion efficiency of solar panels is relatively low, it is highly desirable to provide a high density array of solar panels and to make accessible to solar incident radiation as much surface area of the panels as possible. The picture-frame type panel mounting does not effectively provide such panel mounting, and, as these frames are commonly formed of metal, electrical grounding is usually required.

In addition, solar panel modules comprising solar panels and frames which are adapted for use in present standoff mounting designs are generally factory installed with electrical wiring hard-connected as by soldering or the like, such wiring being often disposed exteriorly of the module for interconnection to other modules. Not only does the externally exposed wiring present a safety and waterproofing problem, but the factory installed construction of the module does not lend itself for ready maintenance and repair.

Furthermore, the known commercial standoff designs utilize complex bracing and support structures for mounting to solar panel modules thereon. The spacing between the modules and the roof shingles is generally utilized to make electrical connections to the modules through junction boxes.

Accordingly, the solar panel mounting techniques of the known art are considered incapable of providing low cost installation in a high density panel array with ease of maintenance and repair. The present sophisticated packaging, in further consideration of moisture sealing and aesthetics, is not believed capable of meeting the desired needs of the solar energy industry.

SUMMARY OF THE INVENTION

It is therefore a primary object of the invention to provide an improved support for mounting a solar panel to a roof surface or the like.

It is another object of the invention to provide a solar panel module utilizing a frame supporting a solar panel that is directly attached to a roof surface.

In accordance with the invention, a support for mounting a solar energy panel comprises a frame including a generally flat base having a substantially planar surface for receipt of the solar panel. At least two mounting members, which may be in the form of a substantially flat flange, extend from the base, each mounting member adapted to attach the frame to the roof surface. The mounting members each project downwardly from the base planar surface so as to cause the planar surface to be spaced upwardly from the roof surface upon attachment of the mounting members thereto. The frame base further includes a supporting member projecting downwardly from the planar surface for engagement with the roof surface, such supporting member being disposed intermediate the mounting members for providing support to the solar panel interiorly thereof when the frame is mounted to the roof surface.

In accordance with a particularly preferred arrangement of the invention, a solar panel module comprises a solar panel having an upper surface for receiving incident solar radiation, an opposed under surface and conductive means electrically connected thereto. The module has an elongate frame including a generally flat rectangular base having a support surface for supporting the under surface of the solar panel. Means is provided for removably sealably securing the solar under surface to the frame support surface. The frame includes raceway means for concealed passage of electrical wires electrically connected to the solar panel conductive means. Means is provided for interlocking the frames for forming an assembly of such solar panel modules. The module further includes means for attaching the frame to the roof surface.

DETAILED DESCRIPTION OF THE PREFERRED EMBODIMENT

Figure 1:
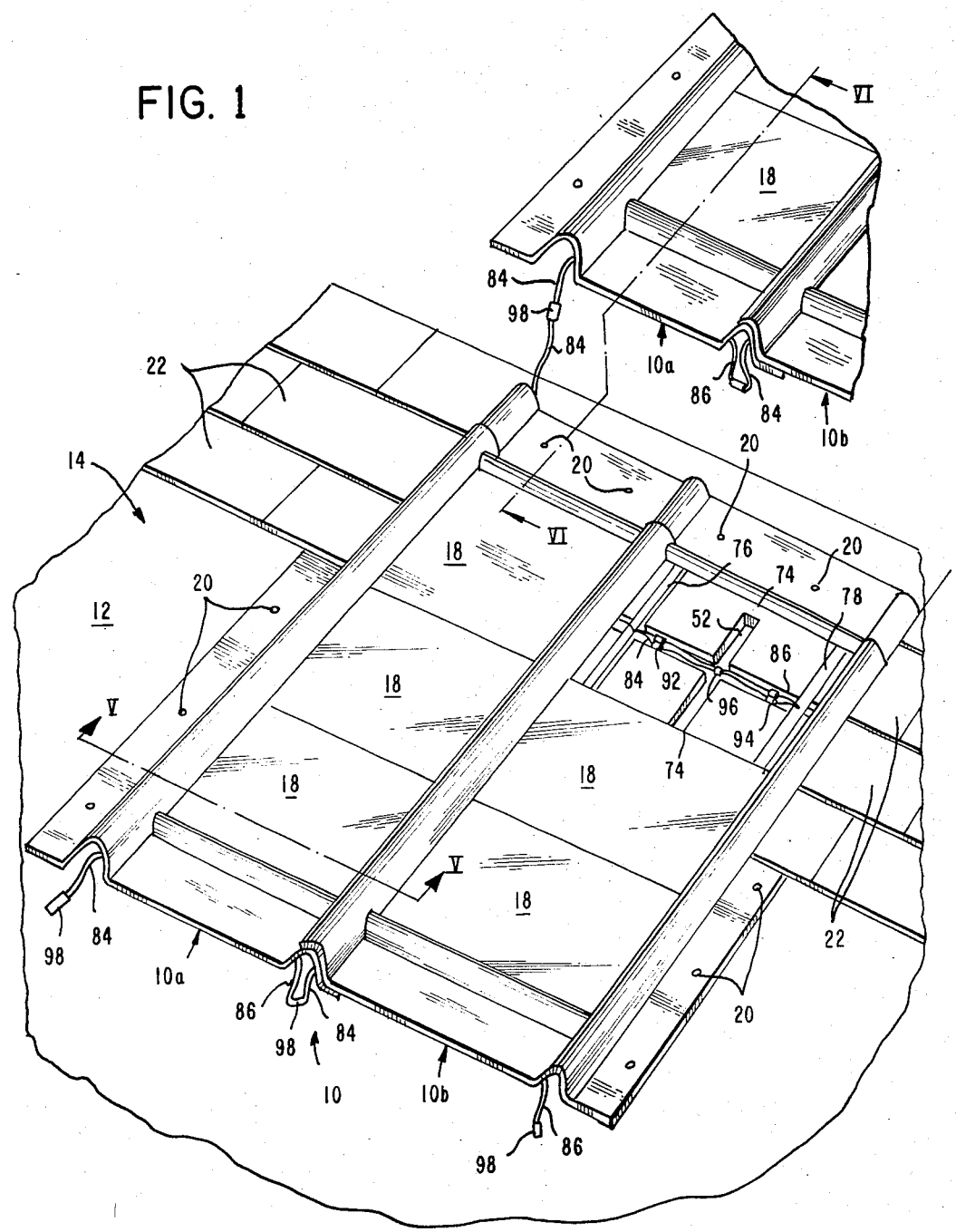
FIG. 1 is a perspective view of an array of solar panel modules mounted, in accordance with the invention, directly to a roof surface, partially exploded and with one solar panel removed for descriptive purposes.

Referring now to the drawing, there is shown in FIG. 1 a direct mounting arrangement in which solar panel modules 10 are directly mounted to the sheathing surface 12 of a roof 14 of a building. Solar panel modules 10a and 10b are constructed slightly differently, as will be described, the modules including frames 16a and 16b being adapted to support three solar panels 18, it being understood that the practice of the invention is not limited to the number of panels 18 shown and described herein. In this regard, for example, one longer panel may be used instead of three separate panels. In module 10b as shown in FIG. 1, one of the panels 18 is removed for purposes of illustration, it also being understood that in the actual construction, a panel 18 would be provided therein. The frames 16a and 16b are mounted on the roof surface 12 in overlapped disposition, as will be detailed, and attached thereto by suitable fasteners, such as conventional roofing nails 20. The frames 16a and 16b are suitably integrated with roofing shingles 22, which integration provides waterproofing protection and an aesthetically pleasing appearance.

In the module arrangement depicted, solar panels 18 preferably comprise a plurality of photovoltaic cells of the silicon type, formed on a transparent glass substrate with an electrically conductive layer interconnecting the individual cells into a connected array. Such panels are commercially available, for example, from Chronar Corp., Princeton, N.J. In assembly, the panel 18 is installed with the transparent substrate exposed to incident radiation and with the conductive layer opposite the exposed surface.

Figures 2, 4:
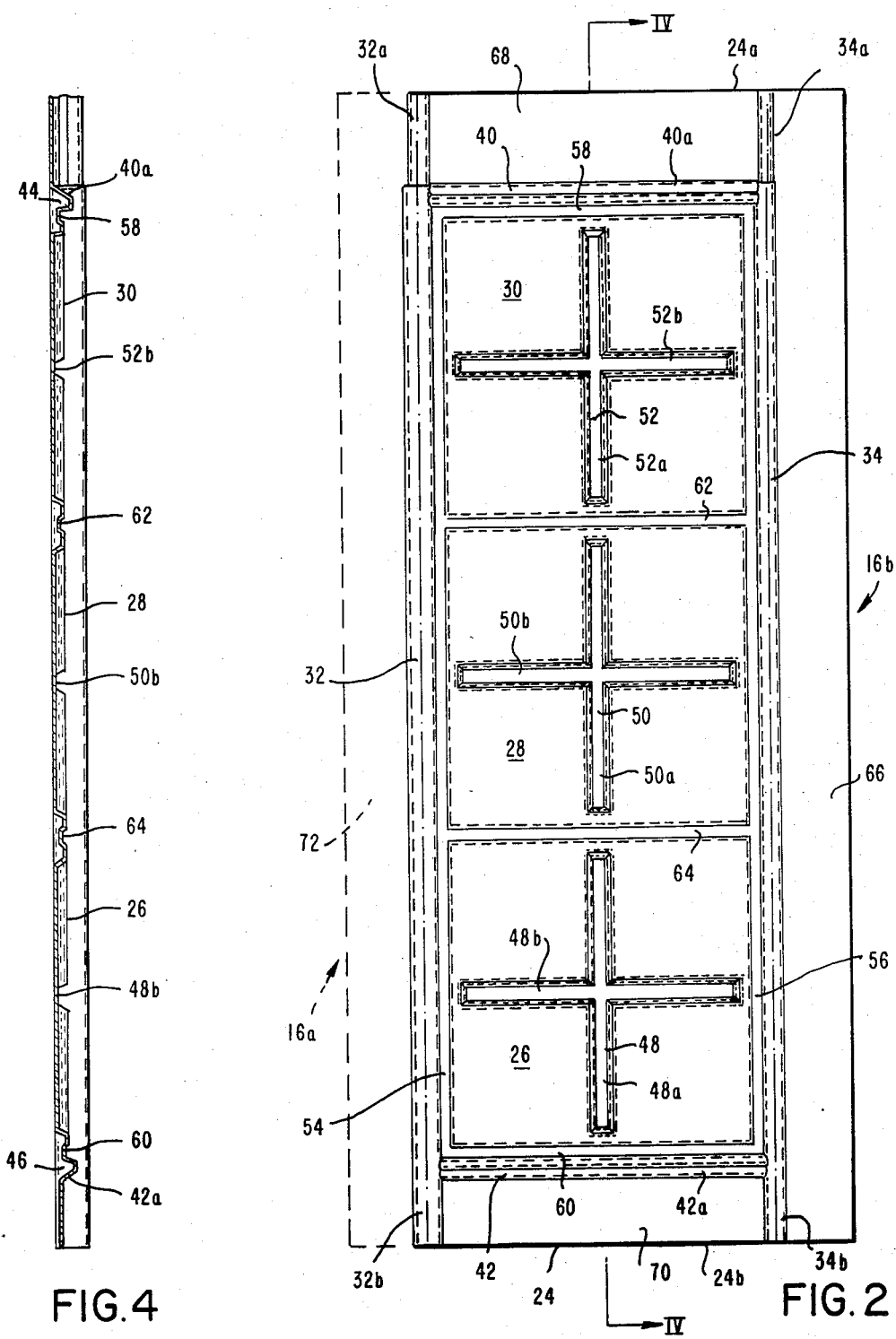
FIGS. 2 and 3 are top plan and side elevation views, respectively, of the solar panel frame of the present invention.
FIG. 4 is a sectional view of the solar panel frame as viewed along viewing line IV—IV of FIG. 2.
Figure 3:
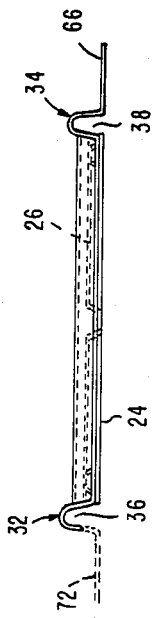

Turning now to FIGS. 2, 3 and 4, the details of the module frames 16a and 16b may be more fully understood. For purposes of simplicity yet sufficient description, frames 16a and 16b are identical in all respects except for one longitudinal edge portion, the edge portion of frame 16a being shown in phantom. Frame 16b comprises an elongate, generally flat rectangular base 24 defining three substantially planar mounting surfaces 26, 28 and 30 extending longitudinally therealong. Each mounting surface 26, 28 and 30 is configured to receive and support thereon a solar panel 18 and is dimensioned in accordance with the panel size, for example, about 12 inches by 12 inches. Extending longitudinally adjacent each laterally spaced opposing edges of the mounting surfaces 26, 28 and 30 is a continuous upstanding ridge or wall 32 and 34 projecting transversely upwardly from the base 24. Walls 32 and 34 extend substantially parallel to each other and are formed to have a curved upper portion having a generally inverted U-shaped configuration, defining thereby a pair of channels 36 and 38 serving as raceways for electrical wires for the solar panel modules, as will be set forth hereinbelow. Extending in parallel and laterally across the base 24 adjacent its longitudinal ends 24a and 24b are a pair of upstanding continuous walls 40 and 42 defining, respectively as shown in FIG. 4, a pair of channels 44 and 46, preferably being in communication with channels 36 and 38 and also serving as wiring raceways. Walls 40 and 42 each comprise an inclined wall surface 40a and 42a sloping obliquely relative to the base planar surfaces.

The side walls 32 and 34 are formed of different configuration to permit interlocking of frames along the longitudinal direction. In this regard, wall 34 is formed to have an exterior curvature that would fit within the interior curvature of the opposing side 32 of another similarly constructed frame. As such, overlapped interlocking of side-by-side frames 16a and 16b is achieved, as shown in FIG. 1. Lateral interlocking of frames is permitted by providing different configurations of the side walls 32 and 34 at the ends of the base 24a and 24b. At end 24a, for example, walls 32 and 34 are stepped-down to have a portion 32a and 34a that would fit into the interior of side walls 32b and 34b at the end 24b of a similarly constructed frame. As such the frames 16a and 16b are capable of overlapping interlocking along their lateral extents, or by reference to FIG. 1, from top to bottom along the roof surface.

Formed amidst each of the planar surfaces 26, 28 and 30 are recesses 48, 50 and 52, respectively, each being formed in a generally cross-like shape. The recesses each have, in the preferred form, a bottom wall 48a, 50a and 52a extending longitudinally in parallel with the side walls 32 and 34 and an intersecting bottom wall 48b, 50b and 52b extending laterally in parallel with the end walls 40 and 42. At the lateral edges of each of the planar surfaces 26, 28 and 30 and contiguously adjacent the side walls 32 and 34, there are a pair of grooves 54 and 56. Grooves 54 and 56 project downwardly from the planar surfaces 26, 28 and 30 and extend longitudinally along the side walls 32 and 34 between the end walls 40 and 42. Grooves 58 and 60 are disposed contiguously adjacent the interior portions of walls 40 and 42 and extend laterally across the base 24. Grooves 62 and 64 also extend laterally across the base 24 at spaced longitudinal positions. Grooves 58, 60, 62 and 64 each project downwardly from the planar surfaces 26, 28 and 30. As described herein and shown in the drawing, the grooves define each of the planar surfaces 26, 28 and 30 and extend fully about the periphery of each of such surfaces, the purposes for which will be detailed.

Frame 16b has at a longitudinal edge adjacent side wall 34 a substantially flat flange 66 projecting outwardly therefrom. At the ends 24a and 24b of the frame, substantially flat flanges 68 and 70 extend outwardly of end walls 40 and 42, respectively. Wall portions 32a and 34a extend onto end flange 68 at base end 24a and wall portions 32b and 34b extend onto end flange 70 at base end 24b for the overlapping interlocking purposes described hereinabove. Frame 16a is constructed similar to that of frame 16b, frame 16a having, as shown in FIGS. 2 and 3, a substantially flat flange 72 extending outwardly of and longitudinally along the end wall 32. Frames 16a and 16b are preferably formed of a relatively lightweight, non-conductive material, such as plastic. In the preferred form, the frames are of integral, molded construction for lowcost manufacture and ease of handling. It should be appreciated, however, that the frames may also be formed of a metallic material with suitable consideration given for electrical grounding.

Figure 5:
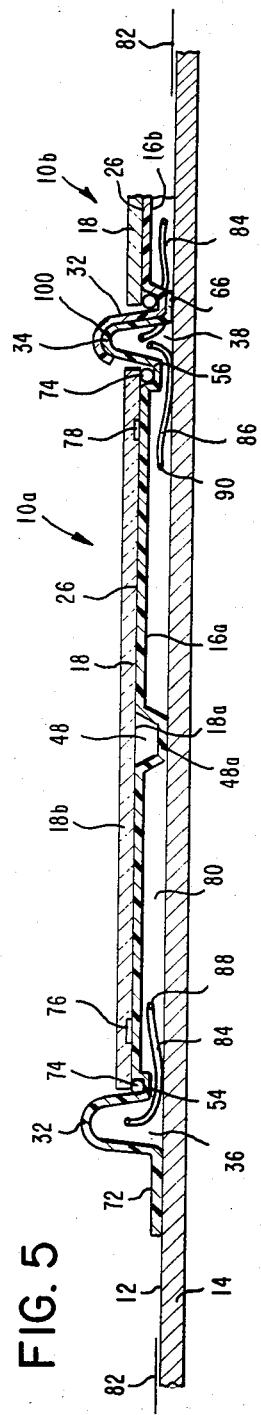
FIGS. 5 and 6 are sectional views of the solar panel modules as seen, respectively, along viewing lines V—V and VI—VI of FIG. 1.
Figure 6:
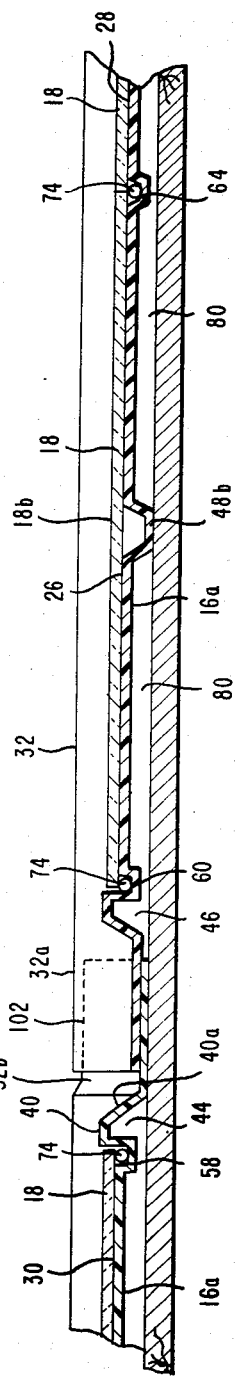

With reference now to FIGS. 5 and 6 as well as to FIG. 1, the assembly of the solar panel modules and the attendant advantages may now be described. The solar panels 18 are installed onto the frame planar surfaces, for example, surface 26, as illustrated in FIG. 5. A quantity of adhesive sealant 74, which may be an uncured butyl mastic, is disposed in the grooves surrounding the planar surfaces (e.g., grooves 54, 56, 60 and 64 around surface 26). The panel 18 is placed onto the surface 26 such that conductive layers on the panel under surface 18a representing positive and negative terminals make electrical engagement with a pair of common bus-bars 76 and 78 suitably supported on the frame. The peripheral edges of the panel under surface 18a are pressed into sealed engagement with the sealant 74 until the panel under surface 18a bottoms onto the frame surface 26. As such, the panel 18 is sealably secured with its upper surface 18 fully free and unencumbered for receipt of incident solar radiation. Removal of a panel 18 is simply effected with a pry-type tool whereby lifting of the panel 18 breaks the seal and allows repair or replacement thereof as well as access to the frame surface 26.

The frames 16a and 16b are formed such that when the frames are attached to the roof surface 12, the planar surfaces 26, 28 and 30 are spaced upwardly from the roof surface 12 defining thereby a cavity 80 between the frame surfaces and the roof. This is achieved by spacing the flanges, e.g., flanges 72 and 66, to extend in a common plane 82 that is substantially parallel to the planar surface 26 but spaced downwardly therefrom. The bottom walls of the recesses, e.g., bottom wall 48a (FIG. 5), are likewise formed to extend in the common plane 82. Accordingly, as flanges 72 and 66, which serve as mounting members, are mounted on the roof surface 12, the bottom walls (48a), being in the same plane as the mounting flanges 72 and 66, engage the roof surface 12 and provide support to the panel 18 interiorly of the peripheral edges thereof. As the panel 18 is supported almost entirely across its under surface 18a, except at the recesses, and as the bottom walls of the recesses provide stiffening members to the frame panel supporting surfaces, the panel support is very strong. This type of support is desirable, as in installation or repair it may become necessary for a work person to walk directly on the panels. The panel support structure as set forth herein together with the flexible properties of a plastic frame capable of absorbing such loads, enables one to walk on the solar panels without causing breakage thereof.

Electrical connection from the bus bars 76 and 78 is effected by routing electrical wires 84 and 86 (FIG. 1) through openings 88 and 90 in the frames, e.g., through a wall of recesses 48, 50, 52. Sealants 92 and 94 disposed in the recess may be used to seal the openings 88 and 90. Additionally, a diode 96 may be interconnected in the recess between the wires 84 and 86 to prevent a backflow of current through the circuit in the event a short develops in the solar panel 18. As depicted in FIG. 5, the wires 84 and 86 are passed beneath the planar surface 26 through cavity 80 and respectively into the channels 36 and 38 defined by the side walls 32 and 34, channels 36 and 38 communicating with the cavity 80 as the bottom walls of the grooves 54–64 are preferably spaced upwardly of the plane 82. The channels 36 and 38 together with the surrounding walls 32 and 34, respectively, serve as raceways for concealing and protecting the wires 84 and 86 passing therethrough. As depicted in FIG 1, the wires 84 and 86 of each module may be interconnected, preferably by means of a conventional waterproof disconnect 98. As such, connection of the appropriate positive and negative terminals of adjoining modules established a suitable electrical circuit for an array of interconnected solar panel modules. The disconnects 98 and interconnected wires are concealed in a raceway when another module is installed. Where no connections are made to various wires, the wires are placed within a raceway and the raceway is suitably sealed. Also, it should be appreciated that the planar surfaces, e.g., surfaces 26, 28 and 30, serve as a barrier wall by which with suitable sealing the electrical connections to the solar panels 18 are isolated from the network of wiring extending beneath such planar surfaces and extending into the raceways.

By reference to FIGS. 5 and 6, the advantages of the frame interlocking aspects of the presently described module may be seen. As described hereinabove, the end wall 32 of the frame 16b overlappingly receives the smaller end wall 34 of the frame 16a along its longitudinal extent. The interface between the overlapped walls, as shown in FIG. 5, may be filled with a sealant 100 for moisture protection as well as adhesion. The overlapped interlock permits the edges of each of the adjacent solar panels 18 to be relatively close, spaced only by the width of the walls 32, 34, thereby providing a high density solar panel mounting. The interlocking of solar panel modules along the lateral extents, or top to bottom of the frames, is shown in FIG. 6. As illustrated, the stepped-down wall portion 32b is received within the wall end portion 32a of the upper or lower adjoining frame. Again, a suitable sealant 102 may be provided for sealing and securing the overlapping portions at their interfaces. Also, with continued reference to FIG. 6, the advantage of the sloping wall surfaces of end walls 40 and 42 may be understood. Sloping wall surface 40a, which, for example, would be facing toward the top of the roof 14, provides a rain runoff surface, preventing undesirable water accumulation around the panels 18.

Having described the preferred embodiment of the present invention, the improved features thereof should now be appreciated. The direct mounting approach provides for a very low profile mounting structure which may be readily used for new installations or building retrofits. The frames as described herein serve, in effect, as shingles themselves whereby the mounting flanges are secured directly to the roof sheathing. The flanges also serve as flashing upon integration with surrounding shingles for additional moisture-proofing. The overlapping interlocking features of the frames provide ease of assembly, sealing and a design capable of high density panel mounting. The concealed raceways for the electrical wiring not only hide the wires but due to their concealment enhance the safety of the system. The removable panels, sealed from underneath, provides full surface radiation receipt and facilitates maintenance, repair and panel replacement without need for dismantling the entire module. In addition, the panel removability provides access to the module frame for repair, if necessary, of electrical components such as the diode or wires. The frame construction which provides nearly a full backing support surface for each of the panels as well as strengthening members providing additional support to the interior undersurface of the panels is sufficiently strong for a work person to walk thereon.

While the invention described herein, together with its attendant advantages and improved features, is directed to the preferred embodiment thereof, it should be appreciated that other variations may be made within the contemplated scope of the invention. Accordingly, the particularly described preferred embodiment is intended to be illustrative and not limited thereto. The true scope of the invention is set forth in the following claims.

I claim:
1. A solar panel module for mounting to a surface of a roof or the like comprising:
   a solar panel having an upper surface for receiving incident solar radiation, an opposed under surface and conductive means electrically connected thereto;

an elongate frame including a generally flat rectangular base having a support surface for supporting the under surface of said solar panel;

means removably sealably securing said solar panel under surface to said frame support surface;

raceway means on said frame for concealed passage of electrical wires electrically connected to said conductive means of said solar panel;

means for interlocking said frames for forming an assembly of solar panel modules;

means for attaching said frame to said roof surface, said raceway means being defined by first and second upstanding continuous walls extending longitudinally adjacent opposing laterally spaced edges of said solar panel, said first and second walls defining first and second channels, respectively for concealed receipt of electrical wires, said laterally spaced walls being differently configured so as to provide said means for interlocking said frames along their longitudinal extents, said first longitudinally extending wall of a module adapted to be relatively overlapped with said second differently configured longitudinally extending wall of another similar module, said interlocking means including means for interlocking a frame to another frame along their lateral extents, said lateral extent interlocking means defined by different configurations of the first and second walls at the spaced longitudinal ends of said frame, whereby the first and second walls at one longitudinal end of a module are insertable into the respective channels defined by said first and second walls at the other end of another similar module.

2. A solar panel module according to claim 1, wherein said frame support surface is substantially planar and extends in contact with the under surface of said solar panels interiorly of panel edges.

3. A solar panel according to claim 1, wherein said base includes at least one groove formed therein for containing an adhesive sealant therein by which said solar panel is removably sealed to said frame.

4. A solar panel according to claim 3, wherein said base includes a groove peripherally bounding said frame support surface, a pair of spaced grooves extending respectively longitudinally adjacent the first and second walls and at least two longitudinal spaced grooves extending laterally across said base between said pair of grooves and in communication therewith, an adhesive sealant in such grooves sealably securing the peripheral edges of said under surface of said solar panel to said frame whereby said panel upper surface is fully free for receipt of incident radiation.

5. A solar panel according to claim 1, wherein said frame comprises an insulative material and wherein said raceway means and said interlocking means are integral therewith.

6. A solar panel according to claim 1, wherein said conductive means includes at least two wires defining positive and electrical terminals, said wires extending concealably in said raceway means and having connector means for connection thereto.

7. A solar panel according to claim 1, wherein said attaching means includes, on at least one of said longitudinal edges, a substantially flat flange for mounting said frame to said roof surface, said flange further defining flashing for roof shingles overlapped thereover.

8. A solar panel module for mounting to a surface of a roof or the like comprising:

a solar panel having an upper surface for receiving incident solar radiation, an opposed under surface and conductive means electrically connected thereto;

an elongate frame including a generally flat rectangular base having a support surface for supporting the under surface of said solar panel;

raceway means on said frame for concealed passage of electrical wires electrically connected to said conductive means of said solar panel, said raceway means being defined by first and second upstanding continuous walls extending longitudinally adjacent opposing laterally spaced edges of said solar panel, said first and second walls defining first and second channels, respectively, for concealed receipt of electrical wires;

means for interlocking said frames for forming an assembly of solar panel modules; and means for attaching said frame to said roof surface, said base including a groove peripherally bounding said frame support surface, a pair of spaced grooves extending respectively longitudinally adjacent the first and second walls and at least two longitudinal spaced grooves extending laterally across said base between said pair of grooves and in communication therewith, an adhesive sealant in such grooves removably sealably securing the peripheral edges of said under surface of said solar panel to said frame whereby said panel upper surface is fully free for receipt of incident radiation.

* * * * *